United States Patent

[11] 3,591,845

[72] Inventors Cornelius E. Vanderpoel, Jr.
7901 12th St. North, Petersburg, Fla. 33702;
Morton I. Broad, 1875 McCarley Road, Clearwater, Fla. 33515
[21] Appl. No. 885,592
[22] Filed Dec. 16, 1969
[45] Patented July 6, 1971

[54] AUTOMATIC CONTROL CIRCUIT FOR HEADLIGHTS AND WINDSHIELD WIPERS OF MOTOR VEHICLES
5 Claims, 1 Drawing Fig.
[52] U.S. Cl. .................................................. 307/10, 315/82, 180/103
[51] Int. Cl. .................................................. H02g 3/00

[50] Field of Search .......................................... 307/9, 10; 340/76; 315/77, 82, 83; 318/DIG. 2; 180/82, 103

[56] References Cited
UNITED STATES PATENTS
3,500,119  3/1970  Price ............................ 315/82
3,500,120  3/1970  Schultz ........................ 307/10 UX Primary Examiner—Robert K. Schaefer
Assistant Examiner—H. J. Hohauser
Attorney—Edwin E. Greigg ABSTRACT: An auxiliary circuit adapted to be incorporated into the electrical wiring system of a motor driven vehicle is provided which automatically triggers the headlights to their lighted condition upon activation of the windshield wipers. The headlights are automatically turned off upon deactivation of the windshield wipers or placement of the ignition switch in the "off" position.

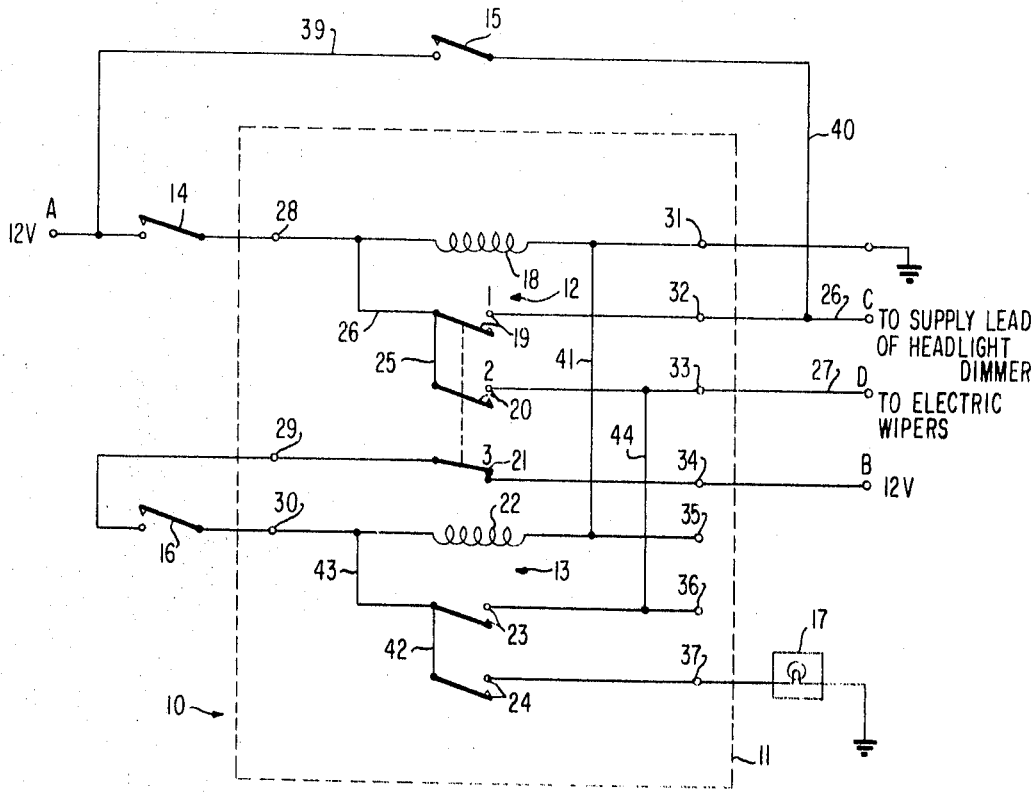

AUTOMATIC CONTROL CIRCUIT FOR HEADLIGHTS AND WINDSHIELD WIPERS OF MOTOR VEHICLES

BACKGROUND OF THE INVENTION

Because of the number of accidents and fatalities occurring on roads and highways, the total number of productive man hours lost has been growing larger and larger each year at an alarming rate. As a result, much emphasis is being placed on highway safety. This is most evident in the increasing amount of safety legislation being enacted in the several states which require various types of safety equipment to be installed on all cars as standard equipment.

Most recently, one of the areas to which legislation is being directed relates to the use of windshield wipers and lights during conditions of rain, snow or fog. When rain, snow or fog are present, the condition is usually accompanied by a reduction in the amount of available light. As a result, it frequently becomes necessary for motorists to turn on their lights to increase their visible range. Since in many instances, there is some amount of light available, motorists frequently resort only to the use of the parking lights in the mistaken belief that they can see sufficiently ahead to avoid accidents. While the energization of the parking lights, which also light the rear lights of the motor vehicle, give notice to nearby motor vehicles approaching from the rear or front, the parking lights are insufficient in times of heavy rain, snow or fog.

Several states having recognized the need for additional lighting during such bad weather conditions and the fact that many motorists do not turn on their headlights under such conditions, have enacted legislation which requires a motorist, when he has need of windshield wipers during conditions of rain, snow or fog, to have his full headlights in operation. Unfortunately, cars are presently designed with separate controls for the lights and the windshield wipers. As a result, many motorist, through habit, forgetfulness or neglect, fail to operate their headlights in rainy, snowy or foggy weather, even though the use of said headlights would be desirable as a safety measure or may be required by law.

Summary Of The Invention

The present invention overcomes the disadvantages arising from separate controls and has for its primary object to provide a circuit which automatically triggers the headlights on, upon activation of the windshield wipers.

Another object of the present invention is to provide such a circuit which is further designed so that the headlights are automatically turned off upon deactivation of the windshield wipers or shutting off of the ignition switch for parking. This avoids the problem of rundown batteries which frequently occurs because of the forgetfulness of the motorist to notice that he has left his lights on. Since the need may occur for operating either the headlights or windshield wipers separate from each other, it is another object of the present invention to provide auxiliary operating controls, together with a warning device for indicating the operation of the wipers without operation of the headlights.

Still another object of the present invention is to provide an accessory control circuit which may be readily connected into existing electrical systems of a motor vehicle so as to automatically cause the headlights to be triggered on activation of the windshield wipers.

DRAWINGS

These and other objects of the present invention, together with their attendant advantages, will become readily apparent from the following description taken in conjunction with the accompanying drawing, which is a schematic diagram of the circuit embodying the invention as incorporated into a conventional ignition system.

DESCRIPTION OF THE PREFERRED EMBODIMENTS

Referring now to the drawing, reference character 10 generally refers to the control circuit of the present invention which is adapted to be incorporated into the electrical wiring system of an automobile. Although the invention is described particularly in connection with the electrical system of an automobile, it should be apparent that it can also be used with any vehicle having a lighting system and a windshield wiper system where it is desired to automatically energize the lights upon activation of the windshield wipers.

Advantageously, a circuit board 11, shown in outline form by dash lines, is provided for supporting control relays 12 and 13. Board 11 may be mounted in any convenient location, such as under the dash of the automobile. Those components illustrated in the drawing within the dash lines are normally situated on the circuit board, while those components illustrated in the drawing to the outside of the dash lines are normally disposed within the view and reach of the operator of the automobile.

Switch 14 represents the wiper energizing switch of the wiper system, while switch 15 represents the normal headlight control switch. Switch 16 is an auxiliary wiper energizing control and light 17 is a warning indicator adapted to be lit upon actuation of the auxiliary wiper switch 16. Light 17 indicates energization of the wiper elements or motor without activation of the main headlights. Switch 16 and indicator 17 are normally positioned, along with switches 14 and 15 and other operator control elements, within reach of the vehicle operator, preferably on the dash of the automobile.

Control relay 12 comprises an energizing coil 18 and three poles or pairs of contacts 19, 20 and 21. Two of the poles 19 and 20 are normally open and are closed upon energization of winding 18, while the third pole 21 is normally closed and is opened upon energization of the winding. Control relay 13 also includes an energizing coil 22 and two poles or pairs of normally open contacts 23 and 24, both of which are closed upon energization of the coil. To facilitate connection of the control relays mounted on the circuit board 11 to the power conductors of the vehicle electrical system, a number of connecting terminals 28—37 are provided on the circuit board.

Coil 18 is connected across terminals 28 and 31. Terminal 31 is returned to a ground connection on the vehicle, while terminal 28 is connected to the positive supply of the vehicle through the contacts of wiper switch 14 in its actuated position. The movable contact arms of poles 19 and 20 are connected in common by a jumper lead 25 which is, in turn, connected by conductor 26 to the positive supply terminal 28. The fixed contact of pole 19 is connected to terminal 32 and a first circuit is established when relay 12 is energized through conductor 26 connected to the supply lead of the vehicle headlight dimmer switch (not shown), but diagrammatically illustrated by terminal C. A second circuit is established through the second pole 20 and conductor 27 connected to terminal D which represents the power input connection to the electrical wiper system of the motor vehicle. Connection to the lighting system of the vehicle through pole 19 may be bypassed through a single pole, normally open headlight ON/OFF switch 15. Switch 15 has its fixed contact connected through conductor 39 to the hot side of switch 14, i.e. positive terminal A, and its movable contact connected directly to conductor 26 or terminal C through conductor 40.

A third circuit is enabled through pole 21 when the first control relay 12 is deenergized. It should be noted that this circuit is always disabled when relay 12 is energized. The third circuit includes the energizing coil 22 of the second control relay 13. One end of coil 22 is connected by jumper 41 to ground terminal 31. The other end of coil 22 is connected to the movable contact arm of auxiliary wiper switch 16. The fixed contact of switch 16 is connected to a positive 12-volt source provided at terminal B through pole 21. This source may be established from the "hot" side of the ignition switch or any suitable accessory control on the motor vehicle.

Wiper switch 16 is a normally open, manually operable, single-pole, single-throw switch connected in series between terminals 29 and 30 and supported separate from the circuit board. Poles 23 and 24 have their movable contacts connected in common by jumper 42 which is, in turn, connected to terminal 30 through jumper or conductor 43. The fixed contact of pole 23 is connected to terminal 36 which is, in turn, connected to the wiper circuit terminal 33 through jumper 44. The fixed contact of pole 23 is connected through terminal 37 to one end of the auxiliary indicator light 17, the other end of which is returned to ground.

In operation, when wiper switch 14 is actuated to its closed position, power is applied to the energizing coil 18 of control relay 12. The normally open contacts of poles 19 and 20 are pulled in and a first circuit through pole 19 energizes the headlights of the vehicle. A second circuit through pole 20 supplies power to the windshield wiper system which may, for example, be of the type shown and described in U.S. Pat. No. 2,513,247.

Upon energization of the control relay 12, the third pole 21 is opened to prevent energizing power from being applied to the winding 22 of control relay 13. Relay 13 has its contact poles connected to permit energization of the wiper without energizing the lighting system. Such a separate control may be desirable on various occasions, such as, for example, where it may be necessary to use the wipers while the car is at a drive-in movie, but where it is undesirable to energize the lights. To this end, when wiper switch 14 is turned off, i.e. when the contacts are opened, relay 12 deenergizes causing poles 19 and 20 to open and pole 21 to close. This allows power to be applied from terminal B to coil 22 upon closure of the auxiliary wiper switch 16. The auxiliary indicator light 17 mounted on the dash and connected in series with pole 24 provides a warning signal to the operator that the wipers are being operated without the headlights. Of course, other types of indicators could be used to alert the driver that the proper mode for driving is not energized. As hereinbefore described, bypass switch 15 permits energization of the headlights without actuation of the wiper system.

While but one embodiment of the present invention has been illustrated and described in detail, it should be understood that the details thereof are not intended to be limitative of the invention, except insofar as set forth in the accompanying claims.

That which we claim is:

1. In an electrical circuit for selectively controlling the energization of the headlights and the drive motor of the windshield wipers of a motor vehicle either simultaneously or independently of each other, the improvement comprising, first control means adapted to be energized for simultaneously establishing a first energizing circuit for the headlights and the windshield wipers drive motor, second control means adapted to be energized for establishing a second energizing circuit for the windshield wipers drive motor, said first control means including contact means connected in circuit with said second control means and being responsive to deenergization of said first control means to permit energization of said second control means to thereby establish an independent energizing circuit for the windshield wipers drive motor.

2. In an electrical circuit as set forth in claim 1, wherein said second control means includes indicator means adapted to be energized upon energization of said second control means to alert the operator of the motor vehicle of the energization of the windshield wipers drive motor independently of the headlights of the motor vehicle.

3. In an electrical circuit as set forth in claim 1, further including a circuit means connected to bypass said first control means for establishing an independent energizing circuit to said headlights.

4. In an electrical circuit as set forth in claim 1, wherein said second control means includes a manually operable switch serially connected with said contact means to permit manual control of the energization of said second control means, said second control means further including first contact means and second contact means serially connected with said switch for establishing upon energization of said second control means said independent energizing circuit and an alarm circuit for alerting the motor vehicle operator of the establishment of said independent energizing circuit.

5. In an electrical circuit as set forth in claim 4, wherein said first control means includes a manually operable switch and a pair of contact means serially connected with said switch for simultaneously establishing upon energization of said first control means said energizing circuit for the headlights and the windshield wipers drive motor.